Nov. 18, 1930.  T. PETERSEN  1,781,932
DIESTOCK
Filed April 14, 1928
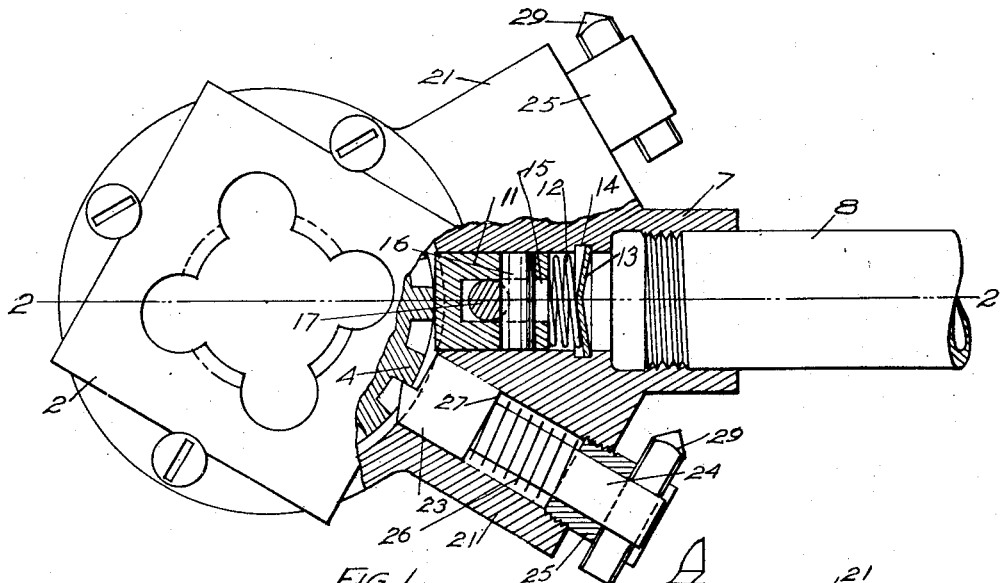
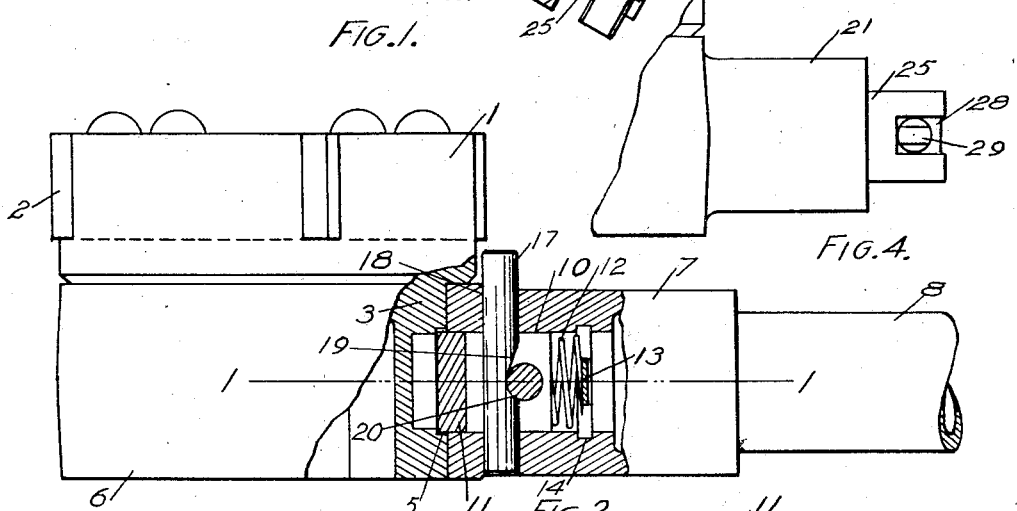
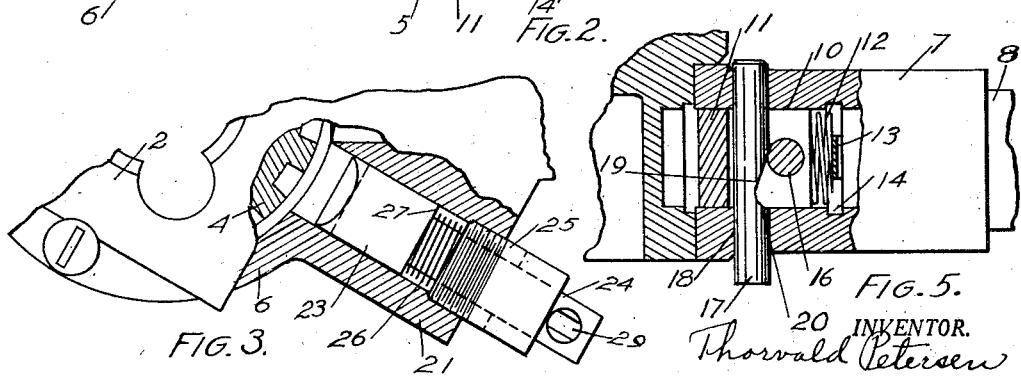
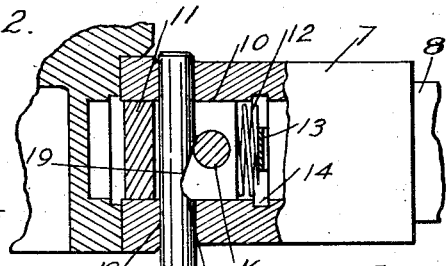
INVENTOR.
Thorvald Petersen
BY
ATTORNEYS.

Patented Nov. 18, 1930

1,781,932

UNITED STATES PATENT OFFICE

THORVALD PETERSEN, OF ERIE, PENNSYLVANIA, ASSIGNOR TO REED MANUFACTURING COMPANY, OF ERIE, PENNSYLVANIA, A CORPORATION OF PENNSYLVANIA

DIESTOCK

Application filed April 14, 1928. Serial No. 270,106.

This invention is designed to improve die stocks which are ratchet driven. With such stocks it is desirable to provide driving mechanism which may be readily attached to various carriers and the invention is directed to the improvement of this feature. Details of the invention will appear from the specification and claims.

A preferred embodiment of the invention is illustrated in the accompanying drawings as follows:—

Fig. 1 shows a front elevation, partly in section, of a die stock on the line 1—1 in Fig. 2.

Fig. 2 a side elevation, partly in section, on the line 2—2 in Fig. 1.

Fig. 3 a section on the line 1—1 showing a driving pawl in retracted position.

Fig. 4 an elevation of one of the pawl sockets.

Fig. 5 a detail view of the locking pawl structure, this part of the structure being shown in section on the line 2—2 in Fig. 1 and with the locking pawl retracted.

1 marks the carrier, and 2 the die or chaser which may be secured in the carrier in any desired manner, 3 a shank extending from the carrier, 4 ratchet teeth arranged on the shank, and 5 a groove in the shank, the ratchet teeth being preferably arranged in the bottom of the groove.

A driving ring 6 is journaled on the shank. It is provided with a handle socket 7 in which is secured the handle 8.

A locking pawl socket 10 is arranged in the ring in alinement with and in continuation of the handle socket. A locking pawl 11 operates in the socket 10. It is yieldingly urged forward by a spring 12, the spring being arranged between the pawl and a plate 13, the plate being expanded into a seat 14 in the walls of the socket 10. The pawl 11 has a cross groove 15 and a pin 16 extends across this groove. An operating pin 17 is slidingly mounted in an opening 18 extending crosswise of the axis of the socket 10. This pin normally extends beyond the walls of the socket 10 and has a cam notch 19, the cam of the notch being adapted to engage the pin 16 to retract the locking pawl 11 when the pin 17 is forced inwardly toward the wall of the socket. A shoulder 20 locks the pin 17 in place when it is in normal position. This makes a very simple, yet very effective mechanism for locking the ring on the shank.

Driving pawl sockets 21 are arranged on the ring. Preferably there are two of these sockets, each containing a pawl mechanism, the pawl mechanism being so arranged to work alternately on the teeth and thus reduce the slack of the pawl. A pawl 23 is mounted in the opening of the socket 21 and has a shank 24 extending outwardly through a plug 25 at the outer end of the socket. A shoulder 27 is formed between the shank 24 and pawl 23 and a spring 26 is arranged between this shoulder and the plug and yieldingly forces the pawl into operating engagement with relation to the ratchet teeth. The outer end of the plug 25 is provided with a cross slot 28 and a pin 29 extends crosswise through the shank 24 and normally operates in the slot 28. This pin is pointed and indicates the driving direction of the pawl. By withdrawing the pin from the slot 28 the pawl may be reversed, or by leaving the pin crosswise of the slot the pawl may be locked in retracted position.

In operation the driving pawls are locked in their outer position, the locking pawl retracted and the ring may be removed from one shank and placed upon another. The locking pawl released locks the shank in the driving ring and the driving pawls may be set, either forward or back, for either direction of operation.

What I claim as new is:—

1. In a die stock, the combination of a carrier having a shank, said shank having a locking groove and ratchet teeth; a driving ring on the shank; a driving pawl socket in the ring; a driving pawl in the driving pawl socket operating on the ratchet teeth; a locking pawl socket in the ring; and a locking pawl in said locking socket operating in the groove.

2. In a die stock, the combination of a carrier having a shank, said shank having a locking groove and ratchet teeth; a driving ring on the shank; a driving pawl socket in the ring; a driving pawl in the driving pawl socket operating on the ratchet teeth; a locking pawl socket in the ring; a locking pawl in said locking socket operating in the groove; and a cross pin mounted on the ring and acting on the locking pawl to retract it.

3. In a die stock, the combination of a carrier having a shank, said shank having a locking groove and ratchet teeth; a driving ring on the shank; a driving pawl socket in the ring; a driving pawl in the driving pawl socket operating on the ratchet teeth; a locking pawl socket in the ring; a locking pawl in said locking socket operating in the groove, said locking pawl having a slot therethrough; a pin bridging the slot; and a cross pin having a cam slot therein acting on said pawl pin to retract it.

4. In a die stock, the combination of a carrier having a shank, said shank having a locking groove and ratchet teeth; a ring on the shank; a handle socket on the ring; a locking pawl socket in alinement with the handle socket; a locking pawl in the locking pawl socket; means for actuating the locking pawl; and a driving pawl mounted in the ring and operating on the ratchet teeth.

In testimony whereof I have hereunto set my hand.

THORVALD PETERSEN.